P. P. HILL.
Cultivators.
No. 153,168. Patented July 21, 1874.
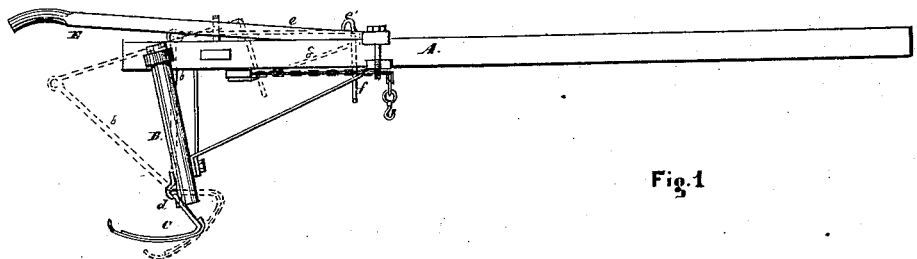
Fig. 1
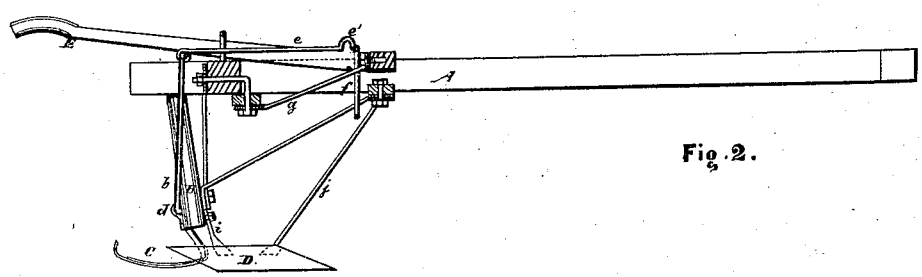
Fig. 2.
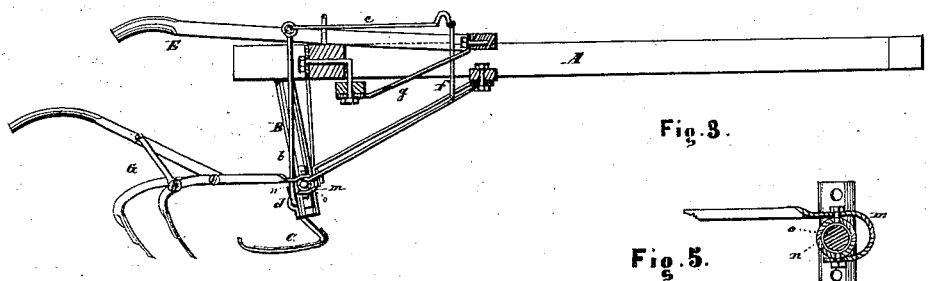
Fig. 3.
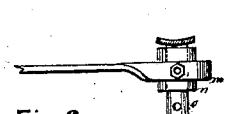
Fig. 5.
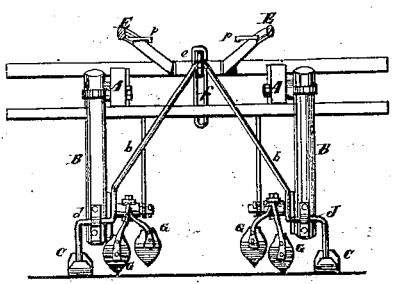
Fig. 4.
Fig. 6.
Witnesses:
Heinr. F. Bruns
R. B. Bacon
Inventor:
Peter P. Hill
by Coburn & Munday
his attys.

UNITED STATES PATENT OFFICE.

PETER P. HILL, OF CRESTON, ILLINOIS.

IMPROVEMENT IN CULTIVATORS.

Specification forming part of Letters Patent No. 153,168, dated July 21, 1874; application filed February 29, 1872.

*To all whom it may concern:*

Be it known that I, PETER P. HILL, of Creston, in the county of Ogle and State of Illinois, have invented certain Improvements in Convertible Cultivator and Scraping-Plow or Gopher; and I do hereby declare that the following is a full, clear, and exact description thereof, reference being had to the accompanying drawings, which, together with the letters and figures marked thereon, form part of this specification, and in which—

Figure 1 represents a side elevation of the frame of the machine with the attachment removed. Fig. 2 is a vertical central longitudinal section of the same with the gopher-plow attached. Fig. 3 is a similar section with the cultivator attached. Fig. 4 is a rear elevation of the machine with the cultivator attached. Fig. 5 is an enlarged side view of the attachment for securing the cultivator to the frame, partially in section; and Fig. 6 is a top or plan view of the same.

Like letters of reference made use of in the several figures indicate like parts.

The nature of the invention will be apparent from the following description and claim.

To enable those skilled in the art to make and use my invention, I will proceed to describe the same with particularity, making use in so doing of the aforesaid drawings.

A is the frame of the implement, consisting of a strong, light, triangular frame-work, projecting to the front to form the tongue, and various cross or tie pieces to strengthen and brace the structure. B B are two standards attached near the rear of the frame, and reaching nearly to the ground. C C are two curved sleds or runners attached to the levers $b$, which extend upward from the front ends of the sleds, and are pivoted to the standards at $d$. These levers are turned diagonally inward and upward, and meet at the center, where they are connected to a rod, $e$, which terminates at the front in a vertical link, $f$, placed astride of the brace $g$. The rod $e$ is provided near the link with an indenture, $e'$, which, when the levers $b$ are drawn back and the sleds tilted, catches in the staple $h$ upon the frame, and retains the sleds in the tilted position indicated by the dotted lines at Fig. 1 of the drawing. D are the "gopher lays" or scrapers, made in the usual form, and furnished with shanks $i$, by means of which they may be attached by bolts to the standards, and also with a brace, $j$, to extend up to the frame in front to strengthen the attachment. The handles E attached to the frame serve to guide and operate the machine as a gopher-plow, and remain upon the frame after it is converted to a cultivator.

When the gopher-lays are attached and the machine used as a gopher-plow, the sleds C stand above the bottom of the lays D to allow the said lays to engage the ground; but when the machine is to be driven off the field or moved from place to place, the sleds C are tilted, and the lays raised from the ground, and kept clear during the removal.

G G are the cultivators, consisting of beams, handles, and attached shovels. The front end of the beams is made with a fork or hook, $m$, which may be attached to a loose sleeve, $n$, placed upon a hub, $o$, carried upon the standards B B, so that a universal connection is formed between the front ends of the cultivator-beams and the said standards.

When the cultivators are to be attached the gopher-lays and braces are first removed, and the sleds C C then rest upon the ground and serve the same purpose as wheels in an ordinary sulky-cultivator. The cultivators may be lifted from the ground and secured in that position by resting the handles upon the pegs $p$.

Having thus described my invention, what I claim as new, and desire to secure by Letters Patent, is—

The combination of the standards B B, frame A, sleds C C, gopher-lays D D, and spindles or hubs $e$, to which cultivator plow-beams may be attached when desired, substantially as specified.

PETER P. HILL.

Witnesses:
 JOHN W. MUNDAY,
 HEINR. F. BRUNS.